United States Patent
Gruber et al.

(10) Patent No.: US 11,428,137 B2
(45) Date of Patent: Aug. 30, 2022

(54) METHOD FOR OPERATING A UREA DOSING SYSTEM IN AN ENGINE SYSTEM, AND ENGINE SYSTEM INCLUDING A UREA DOSING SYSTEM

(71) Applicants: VOLVO TRUCK CORPORATION, Gothenburg (SE); Joseph Gruber, Greencastle, PA (US); Jeffrey Zsoldos, Knoxville, MD (US); Timothy Jacobson, Fairfield, PA (US); Michael Pecsko, Hagerstown, MD (US)

(72) Inventors: Joseph Gruber, Greencastle, PA (US); Jeffrey Zsoldos, Knoxville, MD (US); Timothy Jacobson, Fairfield, PA (US); Michael Pecsko, Hagerstown, MD (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/297,325

(22) PCT Filed: Jan. 2, 2019

(86) PCT No.: PCT/US2019/012021
§ 371 (c)(1),
(2) Date: May 26, 2021

(87) PCT Pub. No.: WO2020/142092
PCT Pub. Date: Jul. 9, 2020

(65) Prior Publication Data
US 2022/0010711 A1 Jan. 13, 2022

(51) Int. Cl.
*F01N 3/20* (2006.01)
*B01D 46/00* (2022.01)
(Continued)

(52) U.S. Cl.
CPC ......... *F01N 3/208* (2013.01); *B01D 46/0027* (2013.01); *B01D 53/9431* (2013.01);
(Continued)

(58) Field of Classification Search
CPC ...... F01N 3/208; F01N 3/035; F01N 2610/02; F01N 2900/0422; F01N 2900/08;
(Continued)

(56) References Cited

U.S. PATENT DOCUMENTS

| 8,181,448 B2 | 5/2012 | Kwon |
| 2009/0301064 A1 | 12/2009 | Maier et al. |

(Continued)

FOREIGN PATENT DOCUMENTS

| EP | 2631443 A1 | 8/2013 | |
| EP | 2876270 A1 * | 5/2015 | ........... F01N 3/2066 |
| JP | 2013113195 A | 6/2013 | |

OTHER PUBLICATIONS

International Search Report (dated Mar. 14, 2019) for corresponding International App. PCT/US2019/012021.
(Continued)

*Primary Examiner* — Brandon D Lee
(74) *Attorney, Agent, or Firm* — WRB-IP LLP

(57) ABSTRACT

In a method for operating a urea dosing system in an exhaust aftertreatment system (EATS) of an engine, an ambient temperature is measured in an environment in which the EATS is disposed, one or more temperatures associated with the EATS to which there is a relationship to a temperature of area in the urea dosing system are monitored. After turning off the engine, whether urea in the urea dosing system is subject to freezing is determined based on the measured ambient temperature and the one or more monitored temperatures. A reversion operation is performed after turning off the engine with a delay until one or more events occur,
(Continued)

the one or more events including determining that urea in the urea dosing system is subject to freezing. An engine system is also provided.

18 Claims, 3 Drawing Sheets

(51) Int. Cl.
  *B01D 53/94* (2006.01)
  *F01N 3/035* (2006.01)
(52) U.S. Cl.
  CPC ......... *B01D 53/9495* (2013.01); *F01N 3/035* (2013.01); *B01D 2279/30* (2013.01); *F01N 2610/02* (2013.01); *F01N 2900/0422* (2013.01); *F01N 2900/08* (2013.01); *F01N 2900/104* (2013.01); *F01N 2900/12* (2013.01); *F01N 2900/16* (2013.01); *F01N 2900/1811* (2013.01)
(58) Field of Classification Search
  CPC ........... F01N 2900/104; F01N 2900/12; F01N 2900/16; F01N 2900/1811; F01N 3/021; F01N 2610/1493; F01N 2900/1602; F01N 9/00; B01D 46/0027; B01D 53/9431; B01D 53/9495; B01D 2279/30; Y02T 10/12; Y02T 10/40
  See application file for complete search history.

(56) References Cited

U.S. PATENT DOCUMENTS

| | | |
|---|---|---|
| 2010/0319326 A1 | 12/2010 | Haeberer et al. |
| 2013/0205756 A1 | 8/2013 | Levin et al. |
| 2013/0291526 A1 | 11/2013 | Gonze et al. |
| 2016/0061080 A1* | 3/2016 | Tanioka ................... F01N 3/02 60/287 |
| 2016/0341089 A1 | 11/2016 | Henry et al. |
| 2020/0116060 A1* | 4/2020 | Suzuki ............... B01D 53/9409 |
| 2020/0284178 A1* | 9/2020 | Barbier ................... F01N 3/208 |

OTHER PUBLICATIONS

Supplementary European Search Report (dated Jun. 17, 2022) for corresponding European App. EP 19 90 6754.

* cited by examiner

METHOD FOR OPERATING A UREA DOSING SYSTEM IN AN ENGINE SYSTEM, AND ENGINE SYSTEM INCLUDING A UREA DOSING SYSTEM

BACKGROUND AND SUMMARY

The present invention relates generally to a method for operating a dosing system for a diesel exhaust fluid in an engine system, and an engine system including a diesel exhaust fluid dosing system. The diesel exhaust fluid is typically but not necessarily aqueous urea and will hereinafter generally be referred to genetically as urea for purposes of discussion, it being understood that the term "urea" is intended to encompass aqueous urea and other diesel exhaust fluids. Similarly, the dosing system shall hereinafter generally be referred to as a urea dosing system for purposes of discussion.

It is typical to provide an exhaust aftertreatment system (EATS) to handle emissions from diesel engines. An EATS will often include a diesel oxidation catalyst (DOC), a diesel particulate filter (DPF), and a selective catalytic reduction catalyst (SCR). Urea is injected upstream of SCR to assist in reducing NOx generated by the engine to N2 and H2O.

When the engine is turned off, particularly in cold temperatures, a reversion process is ordinarily performed to remove urea from components including the lines leading from a reservoir of urea (i.e. a tank), the urea pump, and the urea injection valve. This is to avoid the potential for freezing of urea in the lines. The freezing point for aqueous urea is about −11° C. In some engine systems, a reversion process is performed if an ambient temperature at or below about −11° C. is measured when the engine is turned off. In other systems, a reversion process is performed every time the engine is turned off, regardless what the ambient temperature is.

A drawback to performing a reversion process every time that the engine is shut down or every time that the engine is shut down at a low ambient temperature is that, if the engine is subsequently restarted before the urea in the lines would have been expected to have frozen, then the lines from the tank to the injection valve have to refill with urea before more urea can be injected. In addition to this process being a waste of energy, this process will result in there being a period of time during which urea will not be injected into the SCR to reduce NOx to N2 and H2O, and harmful emissions may be released to the atmosphere.

Further, the injection valve is more prone to becoming clogged when the system reverts immediately because the temperatures at the valve tend to be very hot from exhaust gases. The heat may cause micro-crystals to form inside the injector and externally on the tip of the injector that would not tend to form if urea is left in the valve while the system cools down.

It is desirable to provide a method and apparatus that can minimize the performance of unnecessary reversions.

In accordance with an aspect of the present invention, a method for operating a urea dosing system in an exhaust aftertreatment system (EATS) of an engine is provided. The method includes steps of measuring an ambient temperature in an environment in which the EATS is disposed, monitoring one or more temperatures associated with the HATS to which there is a relationship to a temperature of urea in the urea dosing system, after turning off the engine, determining, based on the measured ambient temperature and the one or more monitored temperatures, whether urea in the urea dosing system is subject to freezing, and performing a reversion operation after turning off the engine with a delay until one or more events occur, the one or more events including determining that urea in the urea dosing system is subject to freezing.

In accordance with another aspect of the present invention, an engine system comprises an engine, an exhaust aftertreatment system (HATS), the EATS comprising a urea dosing system, means for measuring an ambient temperature in an environment in which the EATS is disposed, and means for monitoring one or more temperatures associated with the EATS to which there is a relationship to a temperature of urea in the urea dosing system, and a controller arranged to determine, after turning off the engine, whether urea in the urea dosing system is subject to freezing based on the measured ambient temperature and the one or more monitored temperatures, and to send an instruction to the urea dosing system to perform a reversion operation after turning off the engine with a delay until one or more events occur, the one or more events including determining that urea in the urea dosing system is subject to freezing.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
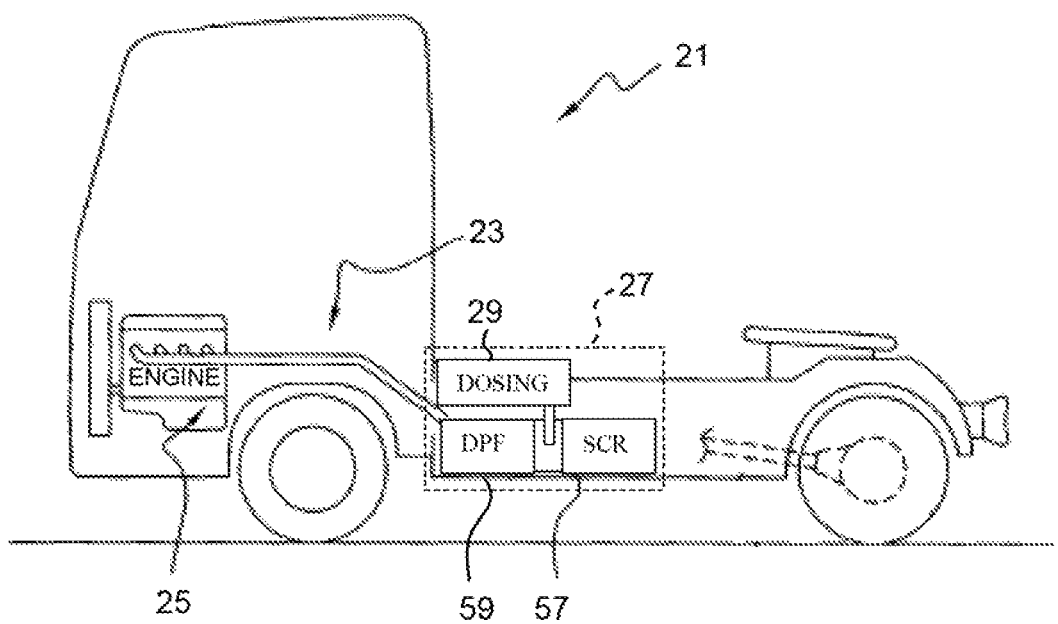
FIG. 1 schematically shows a vehicle including an engine system according to an aspect of the present invention.

A vehicle 21 that includes an engine system 23 according to an aspect of the present invention is shown in FIG. 1. The engine system 23 includes an engine 25 (typically a diesel engine) and an exhaust aftertreatment system (EATS) 27. The EATS 27 comprises a dosing system 29 for a diesel exhaust fluid (typically but not necessarily urea, and the dosing system shall hereinafter be referred to as a urea dosing system for purposes of discussion), means 31 (FIGS. 2 and 3) for measuring an ambient temperature in an environment in which the EATS is disposed, and means 33 (FIGS. 2 and 3) for monitoring one or more temperatures associated with the EATS to which there is a relationship to a temperature of urea in the urea dosing system (except where otherwise indicated, hereinafter referred to as an EATS temperature monitoring means). The ambient temperature measuring means 31 typically includes devices such as a thermometer, thermocouple, thermistor, resistance temperature detector, or other device capable of performing the function of measuring temperature. Likewise, the EATS temperature monitoring means 33 typically includes devices that can be directly wired to a controller 53 such as a thermometer, thermocouple, thermistor, resistance temperature detector, or other device capable of performing the function of measuring temperature, such as a smart sensor of some type that communicates over a controller area network communication bus that need not be directly wired to a controller. It will be appreciated that the present invention has application in engine systems that are not associated with a vehicle 21, however, it is presently anticipated that a particularly useful application for the engine system is in connection with a vehicle. The particular vehicle 21 illustrated is a truck, however, the vehicle may be any other form of vehicle or equipment that includes an engine system 23 of the type described herein, such as a marine vehicle, construction equipment, or a stationary engine.

Figure 2:
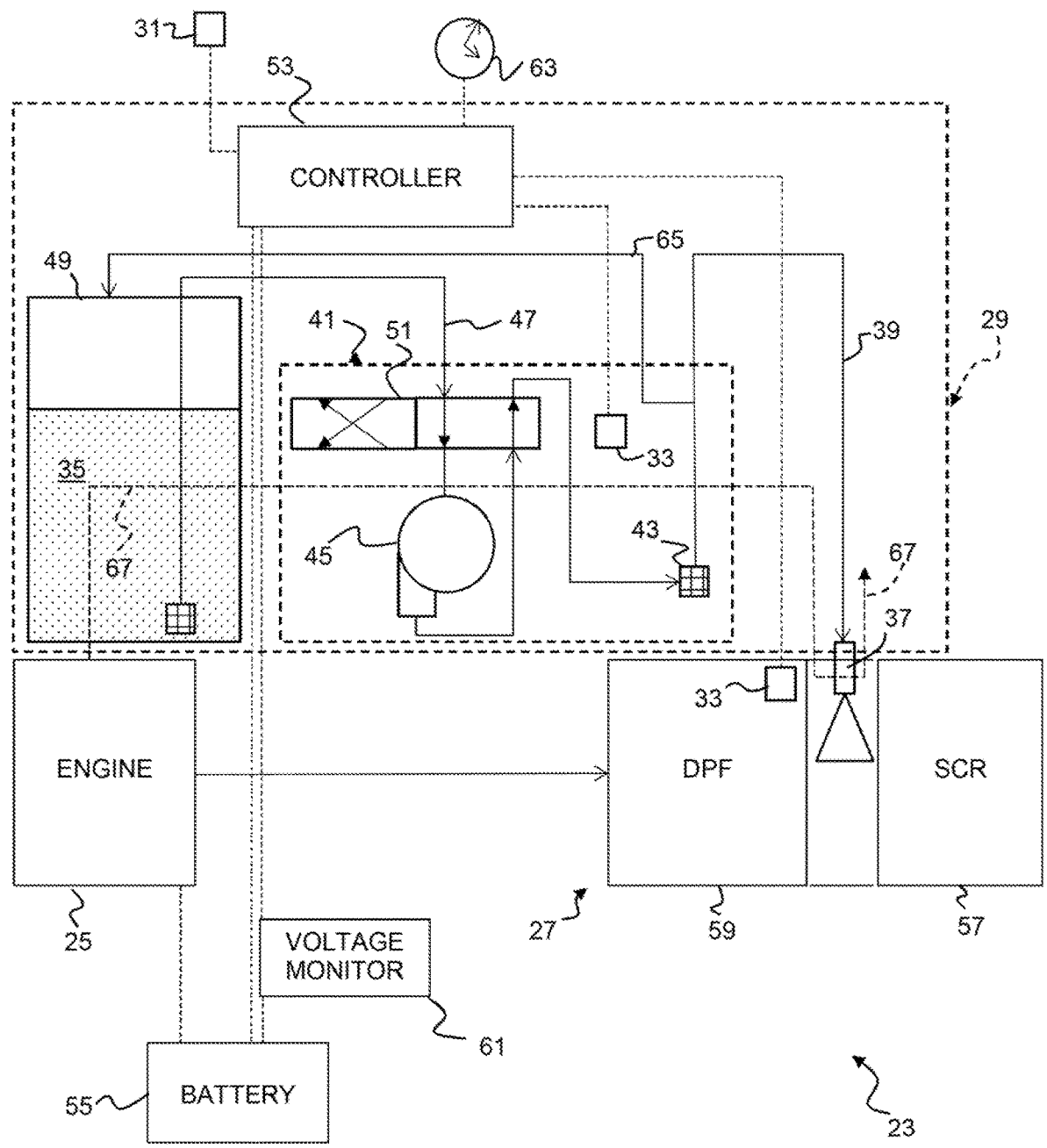
FIG. 2 schematically shows an engine system according to an aspect of the present invention configured to inject urea into an EATS.
Figure 3:
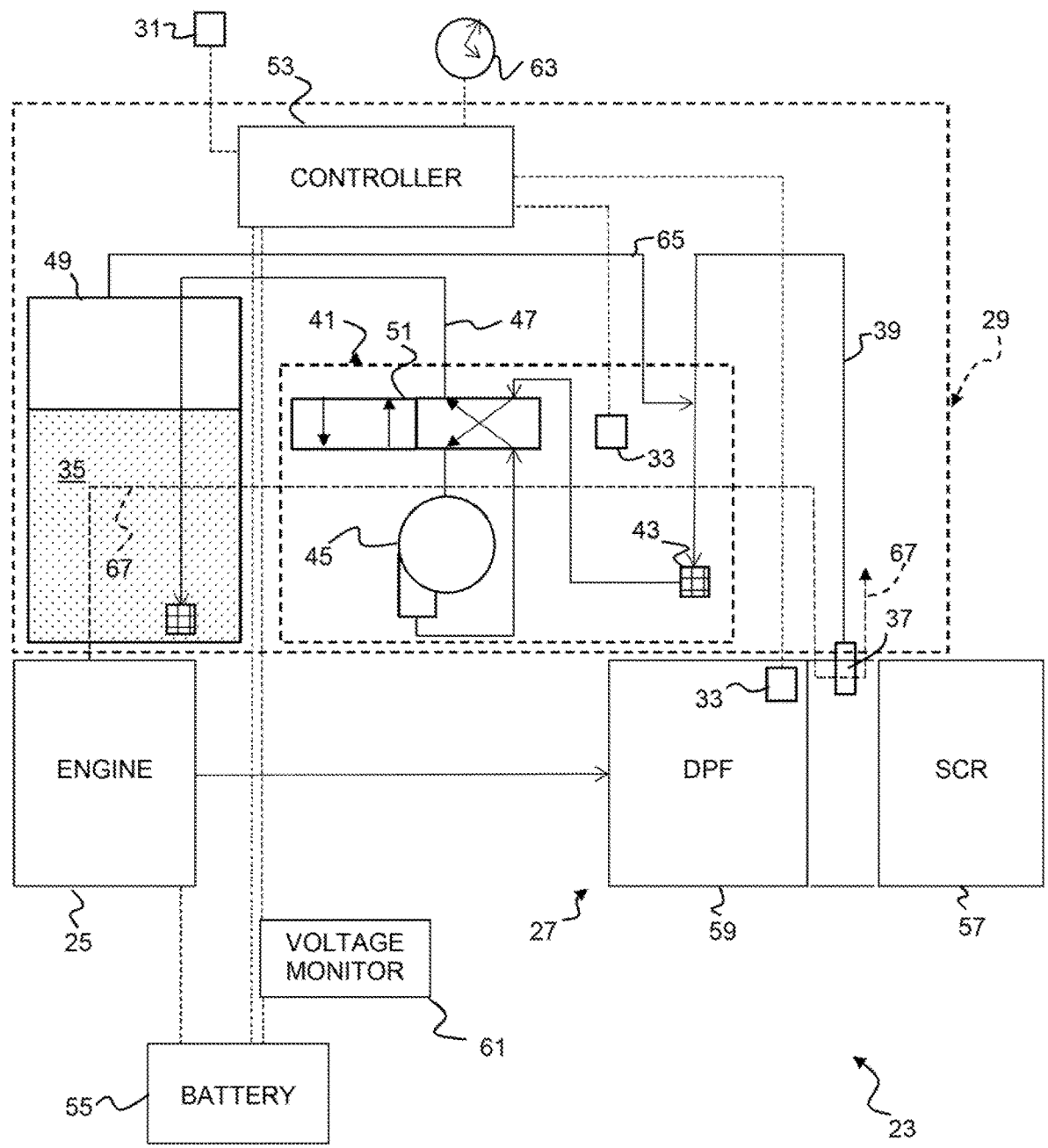
FIG. 3 schematically shows an engine system according to an aspect of the present invention configured to perform a reversion operation.

As seen in FIGS. 2 and 3, the engine system 23 also includes a controller 53 arranged to determine, after turning off the engine 25, whether urea 35 in the urea dosing system 29 is subject to freezing based on the measured ambient temperature and the one or more monitored temperatures, and to send an instruction to the urea dosing system to perform a reversion operation after turning off the engine with a delay until one or more events occur, the one or more events including determining that urea in the urea dosing system is subject to freezing. The controller 53 may have a variety of suitable forms, such as a programmed computer, Engine Control Unit, or Aftertreatment Control Module. The delay that occurs before performing a reversion process will ordinarily be a function of the ambient temperature at shut down of the engine and the monitored temperature that is indicative of the temperature of the urea in the dosing system 29. The delay may be permitted because, for example, residual heat in the components of and proximate the dosing system 29 may keep the urea in the dosing system from freezing for a period of time after turning the engine off. The length of the delay will vary depending upon the construction of the particular dosing system and other factors. Typically, an appropriate length of the delay for a particular system will be determined by testing and/or modeling of the system under consideration.

The ambient temperature measuring means 31 and the EATS temperature monitoring means 33 will ordinarily comprise temperature measuring equipment of the type that sends an electrical signal corresponding to the temperature measured/monitored. Ordinarily, the ambient temperature measuring means 31 will provide only a single signal corresponding to the ambient temperature, usually when the engine is turned off, and is therefore only a minimal drain on a battery 55. By contrast, the EATS temperature monitoring means 33 will ordinarily continuously or periodically take temperature measurements and send signals to the controller 53.

The precise nature of the reversion operation that is performed may vary depending upon the particular engine system structure. FIGS. 2 and 3 schematically show a presently preferred engine system 23 comprising an injection (or urea dosage) valve 37 from which urea 35 is injected upstream of a selective catalytic reduction device (SCR) 57 to reduce NOx generated by the engine 25 to N2 and H2O. The injection valve 37 is connected via a pressure line 39 downstream from a pump unit 41 that typically includes a pump filter 43 connected downstream of a pump motor 45 that is connected via an inlet line 47 to a tank 49 for holding the urea 35. A reverting valve 51 is provided in the inlet line 47 and is switchable between a first or injection position shown in FIG. 2 in which urea 35 pumped from the tank 49 to the injection valve 37 and a second or reversion position shown in FIG. 3 for reversing the direction of flow from the injection valve back to the tank so that urea is sucked from the injection valve and the pressure line 39 and pumped via the inlet line 47 back to the tank. The injection valve 37, the pressure line 39, the pump unit 41, the inlet line 47, and the tank 49 will typically be heated by one or more appropriate heating means, such as by an electric heater and/or a line 67 through which heated engine coolant flows. A backflow line 65 is typically provided to permit urea pumped by the pump unit 41 and that is in excess of the amount of urea that can be injected through the injection valve 37 at the particular pumping pressure to return to the tank 49.

The EATS temperature monitoring means 33 monitors a temperature that, for the particular engine system 23, is known to bear relationship to the temperature of urea in the engine system. By monitoring this temperature, the possibility of urea 35 in the engine system 23 freezing can be determined. When the temperatures measured by the ambient temperature measuring means 31 and monitored by the EATS temperature monitoring means 33 indicate that there is a possibility of freezing of the urea 35 in the engine system, the reversion operation can be performed. The controller 53 can assess the temperatures measured by the ambient temperature measuring means 31 and monitored by the EATS temperature monitoring means 33 and, even though there is a possibility of freezing, can be programmed to delay initiating the reversion operation for a period of time based on the measured and monitored temperatures until the risk of freezing exceeds a predetermined level. In this way, it is possible to avoid unnecessary reversion operations whatever an engine shut-down occurs, as it is possible that the engine will be restarted before freezing will actually occur, and exhaust of NOx during start-up can be minimized.

The EATS temperature monitoring means 33 may be in the form of means for measuring a temperature of the urea dosing pump unit 41 of the urea dosing system 29. Alternatively, or in addition, the EATS temperature monitoring means 33 may be in the form of means for measuring a temperature of an EATS component proximate the injection valve 37 of the urea dosing system. An EATS component that, in many engine systems, is proximate the injection valve 37 and that tends to have a temperature that bears a direct relationship to the temperature of urea 35 in the engine system 23 is a diesel particulate filter (DPF) 59 that is typically disposed immediately upstream of injection valve 37 and the SCR 57. It will be appreciated, however, that the EATS temperature monitoring means 33 may be disposed in a variety of locations, including inside the DPF as shown in FIGS. 2 and 3, and may measure a variety of temperatures that bear a relationship to the temperature of the urea 35 in the engine system 23, such as by or in the injection valve 37, the inlet line 47, the pressure line 39, and/or the backflow line 65, and the foregoing examples are merely illustrative and not restrictive.

In accordance with a further aspect of the invention, the engine system 23 comprises means 61 for monitoring voltage of the battery 55 of the engine 25 where the battery is arranged to start the engine and also to power the EATS temperature monitoring means 33. The controller 53 can be arranged to determine, in response to a signal from the voltage monitoring means 61, after turning off the engine 25, whether voltage of the battery 55 has fallen below a predetermined voltage, and the one or more events that must occur in order for the controller to send the instruction to the urea dosing system 29 to perform a reversion operation after turning off the engine with a delay can include determining that voltage of the battery has fallen below a predetermined voltage. In this way, it can be assured that operation of power draining devices such as the EATS temperature monitoring means 33 (and other battery powered equipment, if provided) will not continue past a point at which the battery 55 no longer has sufficient charge to start the engine 25. The voltage monitoring means 61 can be any suitable device for sending a signal to the controller 53 upon detection of a voltage below a particular value, such as a voltage monitoring relay. In a presently preferred embodiment, the controller 53 reads the voltage directly, however, other alternatives are possible, such as smart sensors that relay voltage level measurements over a controller area network bus. It is presently preferred that battery voltage not fall below a value of 12.2 Volts DC, however, the particular voltage at which the controller 53 will control the engine system 23 to perform a reversion operation may be different in different engine systems and with different factors of safety.

In accordance with a further aspect of the invention, the engine system 23 comprises means 63 for measuring an elapsed time from turning off the engine 23. The controller 53 can be arranged to determine, in response to a signal from the elapsed time measuring means 63, after turning off the engine 25, whether the elapsed time from turning off the engine has exceeded a predetermined length of time, and the one or more events that must occur in order for the controller to send the instruction to the urea dosing system 29 to perform a reversion operation after turning off the engine with a delay can include determining that the elapsed time from turning off the engine exceeds a predetermined length of time. Performing a reversion operation after a predetermined elapsed time provides an additional or alternative measure of safety in addition to or as an alternative to measuring battery voltage to ensure that the battery 55 will not be drained beyond the point where it will not be able to start the engine 23 while monitoring temperature with the EATS temperature monitoring means (or while operating other battery powered components). The predetermined length of elapsed time can, for example, be a function of an expected battery voltage after turning off the engine 23 and monitoring the one or more temperatures associated with the EATS. The elapsed time measuring means 63 can be in any suitable form, such as a clock that is adapted to send a signal to the controller 53 (or is part of a controller, such as an after-treatment control module) after the engine is turned off.

Figure 4:
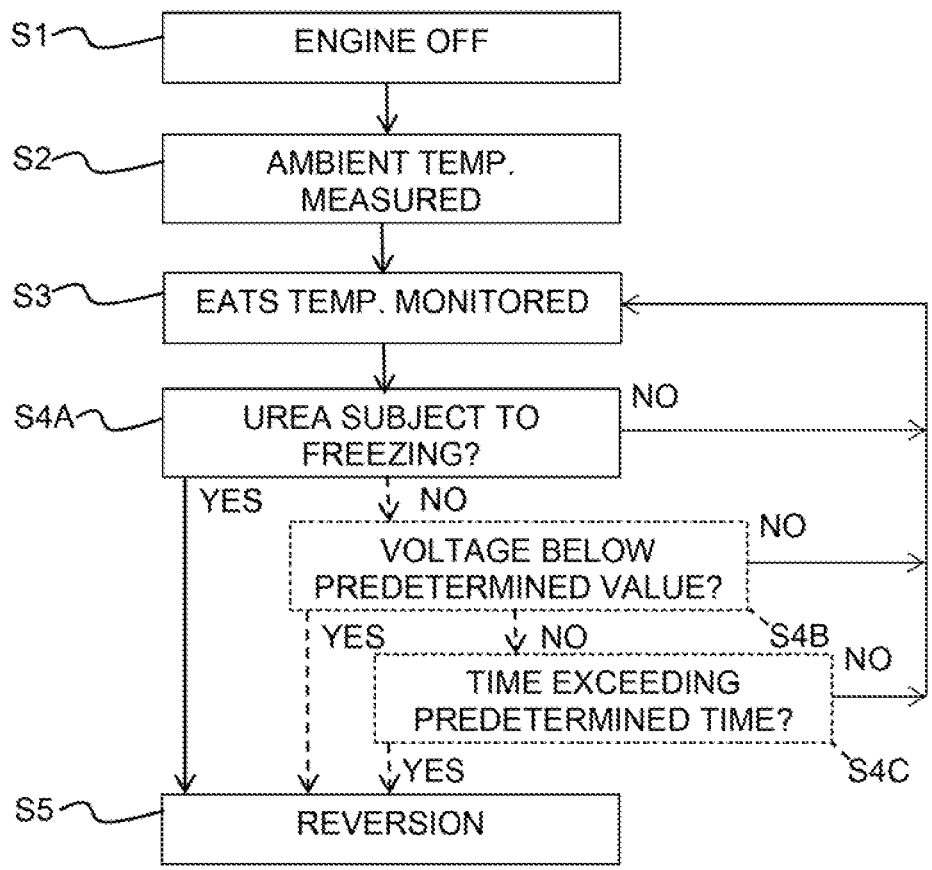
FIG. 4 is a flow diagram showing steps in a method according to an aspect of the present invention.

FIG. 4 shows steps in a method for operating a urea dosing system 29 in an EATS 27 of an engine 25. After the engine 25 is turned off at step S1, an ambient temperature is measured at step S2, via suitable ambient temperature measuring means 31, in an environment in which the EATS 27 is disposed, usually at least a single time after the engine is turned off. While the ambient temperature may be measured only a single time, it may alternatively be intermittently or continuously monitored, however, such intermittent or continuous monitoring may draw more power from the battery 55 than is desirable. Also after the engine 25 is turned off at step S1, one or more temperatures associated with the EATS 27 to which there is a relationship to a temperature of urea 35 in the urea dosing system 29 are monitored at step S3, the monitoring occurring continuously or periodically. After turning off the engine 25 at step S1, a determination is made at step S4A, based on the measured ambient temperature and the one or more monitored temperatures, whether urea 35 in the urea dosing system 29 is subject to freezing. At step S5, a reversion operation is performed after turning off the engine, with a delay based on when freezing of the urea can be expected to occur calculated as a function of the measured ambient temperature and the temperature monitored that is indicative of the temperature of the urea in the dosing system, until one or more events occur, the one or more events including determining at step S4A that urea 35 in the urea dosing system 29 is subject to freezing after the delay.

The one or more monitored temperatures monitored at step S3 can include monitoring of temperatures such as but not limited to a temperature of a urea dosing pump unit 41 of the urea dosing system 29, or a temperature of an EATS component proximate the urea injection valve 37 of the urea dosing system, such as a DPF 59.

The method can further include, at step S4B, monitoring voltage of the battery 55 of the engine 25, the battery being arranged to start the engine and to power the EATS temperature monitoring means. At step S5, a reversion operation is performed after turning off the engine with a delay until one or more events occur, the one or more events including determining at step S4B that voltage of the battery has fallen below a predetermined voltage.

The method can further include, at step S4C, measuring an elapsed time from turning off the engine 25. At step S5, a reversion operation is performed after turning off the engine with a delay until one or more events occur, the one or more events including determining at step S4C that the elapsed time from turning off the engine exceeds a predetermined length of time. The predetermined length of time is ordinarily a function of an expected battery voltage after turning off the engine 25 and monitoring the one or more temperatures associated with the EATS with the EATS temperature monitoring means 33.

The method can be performed with only one of steps S4A, S4B, or S4C being performed. For example, the engine system 23 may only comprise ambient temperature measuring means 31 and EATS temperature monitoring means 33 and a controller 53 for performing step S4A, i.e. determining whether urea is subject to freezing and delaying reversion until it is determined that urea is subject to freezing, and may not include voltage monitoring means 61 or time monitoring means 63 for performing steps S4B or S4C (shown in phantom in FIG. 4 to reflect that they can be omitted). Alternatively, the engine system 23 may only comprise voltage monitoring means 61 and/or time monitoring means 63 for performing steps S4B and/or S4C and may not include ambient temperature measuring means 31 and EATS temperature monitoring means 33 and a controller 53 for performing step S4A. It is, however, presently preferred that all of the steps be performed. As soon as the conditions of any one of steps S4A, S4B, or S4C that the engine system 23 is able to perform are satisfied, a reversion operation will automatically be performed, without necessarily also performing any of the other steps. If fewer than all of the steps S4A, S4B, and S4C are performed, it is presently preferred that at least step S4A be performed using ambient temperature measuring means 31, EATS temperature monitoring means 33, and the controller 53 for determining whether urea is subject to freezing and delaying reversion until it is determined that urea is subject to freezing.

After a reversion operation is performed, equipment associated with the engine system 23 that causes a drain on the battery 55, such as the EATS temperature monitoring means 33, the voltage monitoring means 61, the time measuring means 63, and the controller 53 will ordinarily be shut down so that no unnecessary drain on the battery will occur.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for operating a urea dosing system in an exhaust aftertreatment system (EATS) of an engine, comprising:
    measuring an ambient temperature in an environment in which the EATS is disposed;
    monitoring, with a temperature monitoring means, one or more temperatures associated with the EATS to which there is a relationship to a temperature of urea in the urea dosing system;
    after turning off the engine, determining, based on the measured ambient temperature and the one or more monitored temperatures, whether urea in the urea dosing system is subject to freezing; and
    performing a reversion operation after turning off the engine with a delay until one or more events occur, the one or more events including determining that urea in the urea dosing system is subject to freezing,
    wherein the one or more monitored temperatures includes a temperature of a diesel particulate filter, the temperature monitoring means being disposed in the diesel particulate filter.

2. The method as set forth in claim 1, wherein the one or more monitored temperatures includes a temperature of a urea dosing pump of the urea dosing system.

3. The method as set forth in claim 2, wherein the one or more monitored temperatures includes a temperature of an EATS component proximate a urea dosage valve of the urea dosing system.

4. The method as set forth in claim 1, wherein the one or more monitored temperatures includes a temperature of an EATS component proximate a urea dosage valve in the urea dosing system.

5. The method as set forth in claim 1, comprising monitoring voltage of a battery of the engine, the battery being arranged to start the engine and to power means for monitoring one or more temperatures associated with the EATS, wherein the one or more events include determining that voltage of the battery has fallen below a predetermined voltage.

6. The method as set forth in claim 5, measuring an elapsed time from turning off the engine, wherein the one or more events include determining that the elapsed time from turning off the engine exceeds a predetermined length of time.

7. The method as set forth in claim 6, wherein the predetermined length of time is a function of an expected battery voltage after turning off the engine and monitoring the one or more temperatures associated with the EATS.

8. The method as set forth in claim 1, measuring an elapsed time from turning off the engine, wherein the one or more events include determining that the elapsed time from turning off the engine exceeds a predetermined length of time.

9. The method as set forth in claim 1, wherein ambient temperature is measured when the engine is turned off.

10. An engine system, comprising:
    an engine;
    an exhaust aftertreatment system (EATS), the EATS comprising
        a urea dosing system,
        means for measuring an ambient temperature in an environment in which the EATS is disposed, and
        means for monitoring one or more temperatures associated with the EATS to which there is a relationship to a temperature of urea in the urea dosing system; and
    a controller arranged to determine, after turning off the engine, whether urea in the urea dosing system is subject to freezing based on the measured ambient temperature and the one or more monitored temperatures, and to send an instruction to the urea dosing system to perform a reversion operation after turning off the engine with a delay until one or more events occur, the one or more events including determining that urea in the urea dosing system is subject to freezing,
    wherein the one or more monitored temperatures includes a temperature of a diesel particulate filter, the temperature monitoring means being disposed in the diesel particulate filter.

11. The engine system as set forth in claim 10, wherein the means for monitoring the one or more monitored temperatures monitors a temperature of a urea dosing pump of the urea dosing system.

12. The engine system as set forth in claim 11, wherein the means for monitoring the one or more monitored temperatures monitors a temperature of an EATS component proximate a urea dosage valve of the urea dosing system.

13. The engine system as set forth in claim 10, wherein the means for monitoring the one or more monitored temperatures monitors a temperature of an EATS component proximate a urea dosage valve of the urea dosing system.

14. The engine system as set forth in claim 10, comprising means for monitoring voltage of a battery of the engine, the battery being arranged to start the engine and to power the means for monitoring one or more temperatures associated with the EATS, wherein the one or more events include determining that voltage of the battery has fallen below a predetermined voltage.

15. The engine system as set forth in claim 14, comprising means for measuring an elapsed time from turning off the engine, wherein the one or more events include determining that the elapsed time from turning off the engine exceeds a predetermined length of time.

16. The engine system as set forth in claim 15, wherein the predetermined length of time is a function of an expected battery voltage after turning off the engine and monitoring the one or more temperatures associated with the EATS.

17. The engine system as set forth in claim 10, comprising means for measuring an elapsed time from turning off the engine, wherein the one or more events include determining that the elapsed time from turning off the engine exceeds a predetermined length of time.

18. The engine system as set forth in claim 10, wherein the means for measuring ambient temperature is arranged to measure ambient temperature when the engine is turned off.

* * * * *